United States Patent [19]
Garzarolli et al.

[11] Patent Number: 5,539,791
[45] Date of Patent: Jul. 23, 1996

[54] MATERIAL AND STRUCTURAL PART MADE FROM MODIFIED ZIRCALOY

[75] Inventors: Friedrich Garzarolli, Höchstadt/Aisch; Eckard Steinberg, Erlangen, both of Germany

[73] Assignee: Siemens Aktiengesellschaft, Munich, Germany

[21] Appl. No.: 296,953

[22] Filed: Aug. 26, 1994

Related U.S. Application Data

[63] Continuation of PCT/DE93/0149, Feb. 22, 1993.

[30] Foreign Application Priority Data

May 4, 1992 [DE] Germany ............. 92 06 038.2

[51] Int. Cl.⁶ ..................................................... G21D 3/00
[52] U.S. Cl. ......................... 376/417; 376/416; 376/457; 376/414; 376/415
[58] Field of Search ........................... 376/416, 417, 376/457, 414, 415; 976/DIG. 44, DIG. 53; 148/668, 672; 420/422

[56] References Cited

U.S. PATENT DOCUMENTS

| | | | |
|---|---|---|---|
| 3,005,706 | 10/1961 | Thomas et al. | 75/177 |
| 3,148,055 | 9/1964 | Kass et al. | 75/177 |
| 3,664,825 | 5/1972 | Bergquist | 75/10 |
| 3,901,761 | 8/1975 | Wood | 376/415 |
| 4,610,842 | 9/1986 | Vannesjo | 376/416 |
| 4,810,461 | 3/1989 | Inagaki et al. | 376/457 |
| 4,938,921 | 7/1990 | Mardon et al. | 376/457 |
| 4,942,016 | 7/1990 | Marlow et al. | 376/418 |
| 4,963,316 | 10/1990 | Stehle et al. | 376/416 |
| 4,992,240 | 2/1991 | Komatsu et al. | 420/422 |
| 5,017,336 | 5/1991 | Matsuo et al. | 420/422 |
| 5,076,488 | 12/1991 | Graham | 228/431 |
| 5,122,334 | 6/1992 | Bradley | 376/457 |

FOREIGN PATENT DOCUMENTS

| | | |
|---|---|---|
| 0085553 | 8/1983 | European Pat. Off. . |
| 0194797 | 9/1986 | European Pat. Off. . |
| 2626291 | 7/1989 | France . |
| 2008320 | 9/1970 | Germany . |
| 3442209 | 6/1985 | Germany . |
| 2172737 | 9/1986 | United Kingdom . |

*Primary Examiner*—Donald P. Walsh
*Assistant Examiner*—Meena Chelliah
*Attorney, Agent, or Firm*—Herbert L. Lerner; Laurence A. Greenberg

[57] ABSTRACT

Zircaloy 2 and zircaloy 4 are zirconium alloys which are permitted and tried and tested in nuclear engineering and which have constituents with fixed concentration ranges. The properties, especially corrosion resistance, mechanical stability and sensitivity to pellet-cladding interaction of those alloys are subject to pronounced spreads of unknown origin. According to the invention, the tin content is between 1.4 and 1.8% by weight, the Fe content between 0.1 and 0.25% by weight, the Cr content between 0.1 and 0.3% by weight, the Si content between 0.05 and 0.02% by weight, the O content between 0.05 and 0.11% by weight, the C content below 0.02% by weight and the Ni content below 0.08% by weight. This restriction of the permissible concentration ranges ensures that the material properties are spread only within a narrow favorable range. A liner made from zirconium with an iron constituent of between 0.2 and 0.8% by weight is proposed for the inner lining of a fuel-rod sheathing tube.

16 Claims, 13 Drawing Sheets

MATERIAL AND STRUCTURAL PART MADE FROM MODIFIED ZIRCALOY

CROSS-REFERENCE TO RELATED APPLICATION

This application is a Continuation of International application Ser. No. PCT/DE93/00149, filed Feb. 22, 1993.

BACKGROUND OF THE INVENTION

1. Field of the Invention

The invention relates to a material and a structural part, especially a fuel-rod sheathing tube, made from a zirconium alloy having the constituents of zircaloy, for a boiling-water nuclear reactor.

Due to its small neutron absorption cross section, zirconium which is obtained on a large scale as zirconium sponge and contains minor impurities of other elements, is used for fuel-assembly boxes, spacers, water pipes and other structural parts in the core of a nuclear reactor, especially for the sheathing tubes of fuel rods filled with oxidic nuclear fuel. In order to obtain sufficient chemical and mechanical stability in the coolant of the reactor core over the long service lives of the fuel assemblies, other elements, especially tin, iron, chromium and, if appropriate, nickel as well, are alloyed in small quantities to the zirconium sponge. Table 1 shows zirconium qualities and alloys which are standardized according to ASTM B 352 and 353 and which are cleared for use in nuclear reactors.

The development of those materials is based on corrosion tests under laboratory conditions, in which the chemical aggressiveness of the coolant is increased by means of a considerable rise in temperature, in order to perform tests within short test periods of the corrosion resistance of the material which is exposed to the corrosive coolant over a long service life, during reactor operation under actual conditions. As a result, the weight increase caused by the formation of zirconium oxide is normally used as a measure of the corrosion. It is shown therefrom that, in the first place, a surface layer of zirconium oxide forms quickly, and the aqueous coolant has to diffuse through the surface layer before it can cause corrosion in layers of the material which are located further inwards. The alloyed constituents reduce the oxide formation on the surface and the diffusion of the coolant and thus increase the corrosion resistance of the workpiece.

A particular feature of the boiling-water reactor is that the workpieces have to be corrosion-resistant both to liquid water and to water vapor. According to experience, measures which are effective for water vapor do not always also have an effect in the case of liquid water, and therefore, in particular, laboratory tests at high temperatures and pressures, in which a distinction between the liquid and the vapor phase can no longer be made, do not have any evidential force with regard to corrosion under the operating conditions of boiling-water reactors.

Furthermore, foreign substances, which are contained in the water and which, for example, originate from leaks in condensers or from other components of the coolant circuit or are added for the protection of those components, can concentrate in the non-evaporated liquid droplets and thereby aggravate the corrosion conditions as soon as vapor formation occurs on the hot fuel rods.

In reactor operation under actual conditions, at least in boiling-water reactors, in addition to the long-term corrosion which is distributed relatively uniformly over the surface, there often occurs a local corrosion which emanates from specific corrosion sources, for example regions of differing composition, and which can lead to progressive local destructions of the workpiece. This "nodular" corrosion appears primarily under the operating conditions of the boiling-water reactor, that is to say under the radiation load on the material and the special chemical and thermal influences which cannot be simulated well by the corrosion tests under laboratory conditions.

The hydrogen released during such oxidation is important for the mechanical stability of the workpiece, since it diffuses into the workpiece according to the locally forming hydrogen partial pressure and leads there to a specific hydrogen concentration and hydrogenation. However, hydrogenated regions of zirconium exhibit pronounced embrittlement, so that the workpiece can no longer withstand mechanical loads. The diffusion and absorption of hydrogen and the formation of hydrogenated regions are therefore also to be reduced by the alloyed constituents, for not only external influences occurring during reactor operation, such as, for example, vibrations caused by the flowing coolant, but also thermal effects, an increase in volume occurring during the oxidation and hydrogenation of the material and other operation-related variations lead to unavoidable mechanical stresses. At the same time, it is particularly necessary to also bear in mind that the neutron radiation can lead to variations in the material structure and in the dimensions of the workpieces (in regard to fuel rods, for example, to an increasing length and a decreasing diameter of the sheathing tube). Since those loads arise only in reactor operation under actual conditions, it is necessary from time to time to carry out a thorough inspection of the workpieces used in the reactor, in order to estimate their further behavior, and if appropriate to carry out an exchange and fix the material strengths which are necessary for the workpieces.

Published European Application No. 0 085 553 A2 describes a sheathing tube of a fuel rod which is formed of zircaloy and which, as a result of beta annealing and subsequent quenching, acquires a structure with finely distributed secondary precipitations that are maintained during subsequent fine-forming operations at temperatures of below 620° C. and which have a mean particle size of approximately 0.05 to 0.07 μm. Zircaloy which used in that case is formed of 1.49% Sn, 0.21% Fe, 0.11% Cr, 0.0055% Ni, 0.0082% Si, 0.113% O, 0.0147% C, and the remainder being zirconium with impurities, wherein all particulars are given in % by weight. In an autoclave under vapor at 454° C., the sheathing tube shows less corrosion than conventional zircaloy 4 which is hot-formed at 780° C.

Published UK Application GB 2 172 737 A describes a sheathing tube made from zircaloy 2 (1.45% Sn, 0.16% Fe, 0.12% Cr, 0.05% Ni) with an inner lining made from unalloyed zirconium, the iron content of which is between 0.025 and 0.100%. In another sheathing tube (known from Published European Application No. 0 194 797 A1), an outer layer of zircaloy 2 or zircaloy carries an inner lining made from zirconium with 0.4 to 0.6% Sn, 0.5 to 1.4% Fe and 0.01 to 0.07% O.

SUMMARY OF THE INVENTION

It is accordingly an object of the invention to provide a material and a structural part made from modified zircaloy, which overcome the hereinafore-mentioned disadvantages of the heretofore-known devices of this general type and which improve the "effectiveness" of sheathing tubes made from zircaloy-like materials, that is to say the resistance to damaging influences, while having wall thicknesses which are as small as possible.

The invention proceeds from the fact that results found from short-term tests at relatively high temperatures (for example, above 500° C.) and/or under laboratory conditions have just as little evidential force for boiling-water reactors with their operating temperatures lying approximately at 285° C. as the results from pressurized-water reactors that are likewise observed at relatively high temperatures and with other chemical properties of the coolant. In boiling-water reactors, the influence of specific alloying additives can be completely opposite to the findings made under the varied conditions. The new material ("modified zircaloy") must therefore be optimized primarily according to findings made from long-term tests in reactor operation under actual conditions. However, real tests of this kind are extremely time-consuming, since they must extend over all of the operating cycles provided for a fuel assembly (that is to say, for example, four years and more), and are very expensive. Tests, which are based on pure zirconium or zirconium sponge and in which the most diverse additives are alloyed in order to find a material superior to the permitted zircaloy, are therefore disqualified for practical and financial reasons. The invention therefore adopts the method of employing a systematic variation in the weight fractions of the individual alloying constituents, which are already tested in the case of zircaloy, to find modified upper and lower limits of the corresponding weight fractions, while the grain structure of the material can also be taken into account. Thus, although the new material is well within the concentration ranges of its constituents that are predetermined for zircaloy 2 and/or zircaloy 4 (with even a slight exceeding of the heretofore permitted maximum values seeming expedient), nevertheless it restricts these concentration ranges to such an extent that the properties found in this material have only a relatively small spread and the values found in the most unfavorable case are decisively more favorable than in the concentration ranges used heretofore.

With the foregoing and other objects in view there is provided, in accordance with the invention, a sheathing tube of a fuel rod for a boiling-water nuclear reactor, comprising a zirconium alloy having a given wall thickness and containing:

Sn: 1.45 to 1.7% by weight,
Fe: 0.15 to 0.4% by weight,
Cr: 0.1 to 0.3% by weight,
Ni: up to 0.08% by weight, and a remainder technically pure zirconium; and an inner lining made from an inner layer having a thickness being 5 to 20% of the given wall thickness and being formed of a technically pure zirconium alloy with an alloying additive of 0.2 to 0.8% by weight Fe. The invention therefore provides a fuel-rod sheathing tube which has an inner lining made from ZrFe.

In so far as the inner lining made from zirconium contains further alloying additives, their content is preferably lower than the iron content.

At the same time, the optimization of the material must, in particular, take the following into account:
  the long-term corrosion,
  the hydrogen absorption and
  the nodular corrosion under the conditions of the boiling-water reactor, while in addition,
  the occurrence of PCI defects in the case of rapid local power changes and
  the risk of large-area defects emanating from the inside, must be taken into account.

Table 3 shows the minimum and maximum limits emerging from the invention for the alloying constituents which are important for the causes of damage. In this table, more particular limit values that are considered to be advantageous are given in brackets. Next to them, the limit values differing therefrom for the standardized alloys zircaloy 2 and zircaloy 4 are indicated for comparison.

Table 4 indicates minimum and maximum concentration limits for advantageous materials which at the same time meet the specification for zircaloy 2 and zircaloy 4. Next to them under the designation "Zry-Cr", there are given different, but promising upper limits for the concentration of chromium and for the sum of iron, chromium and nickel, which are only slightly above the maximum values prescribed for zircaloy 2 and zircaloy 4 and which lead to a modified zircaloy, the licensing of which as a reactor material would therefore seem to present no further difficulties.

In accordance with another feature of the invention, the zirconium alloy has a silicon content of between 0.005 and 0.012% by weight, an oxygen content of between 0.05 and 0.12% by weight, and a carbon content of below 0.02% by weight, and the inner layer has an iron content of at least 0.3% by weight.

In accordance with a further feature of the invention, the zirconium alloy has a silicon content of between 0.005 and 0.012% by weight, an oxygen content of between 0.05 and 0.12% by weight, and a carbon content below 0.02% by weight, and the inner layer has an iron content of at most 0.6% by weight and preferably approximately 0.5% by weight.

In accordance with an added feature of the invention, the zirconium alloy has the following composition:

Sn: 1.45 to 1.7% by weight,
Fe: 0.15 to 0.2% by weight,
Cr: 0.12 to 0.25% by weight,
Ni: 0.03 to 0.05% by weight,
Si: 0,007 to 0.012% by weight,
O: 0.05 to 0.11% by weight,
C: below 0,015% by weight, and a remainder of technically pure zirconium; and the inner lining has the following composition: Fe: 0.3 to 0.6% by weight and advantageously approximately 0.5% by weight, and a remainder of technically pure zirconium.

In accordance with an additional feature of the invention, the alloying additives precipitated in the zirconium alloy have a mean particle size of between 0.03 and 0.1 µ and advantageously below 0.07 µ.

In accordance with a concomitant feature of the invention, there is provided a fuel rod for a boiling-water nuclear reactor, with a sheathing tube as described above.

The materials being tested primarily are given in Table 5.

Other features which are considered as characteristic for the invention are set forth in the appended claims.

Although the invention is illustrated and described herein as embodied in a material and a structural part made from modified zircaloy, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
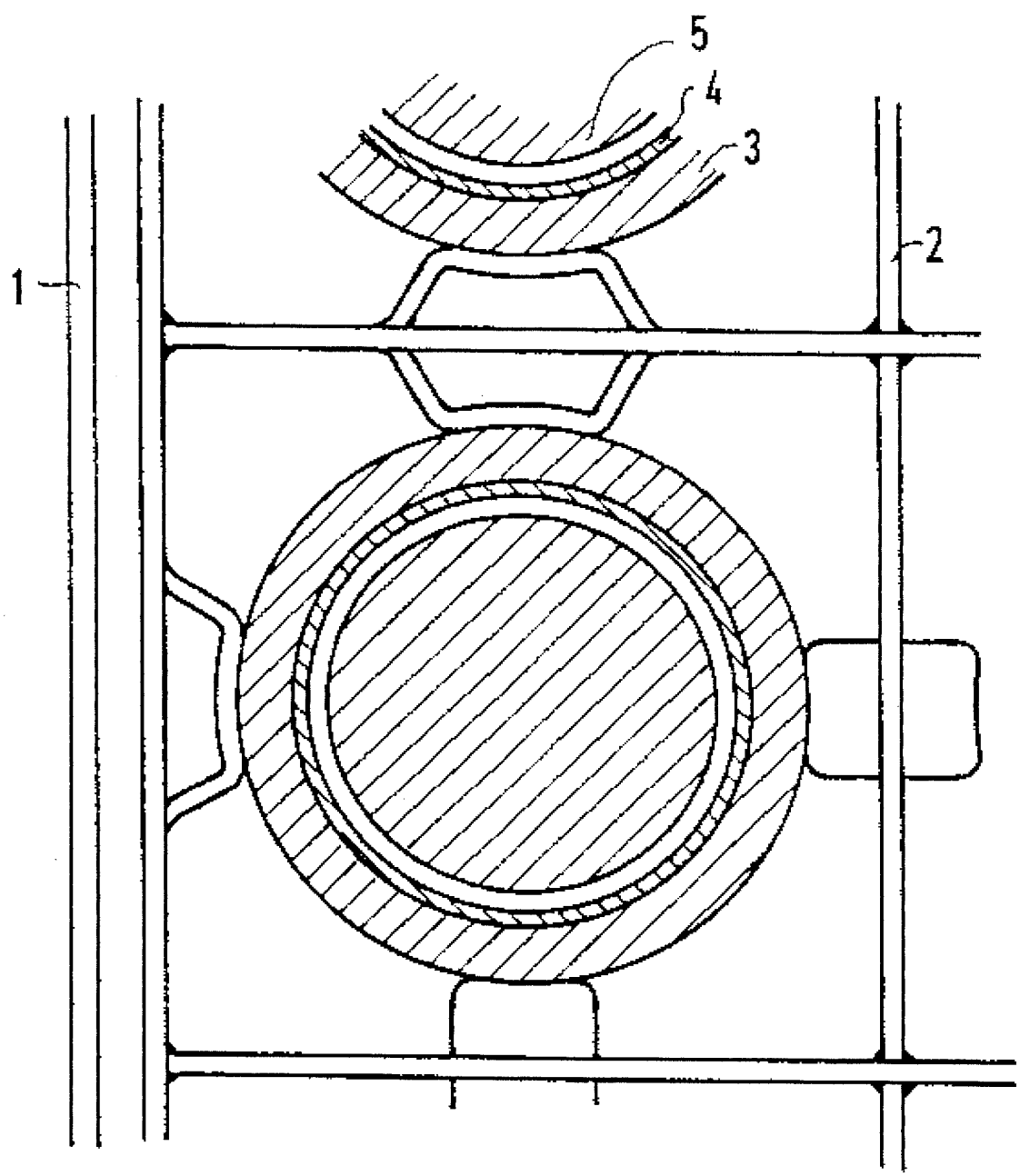
FIG. 1 is a cross-sectional view of a structure of a fuel assembly with structural parts according to the invention.

Referring now to the figures of the drawing in detail and first, particularly, to FIG. 1 thereof, there is seen a fragmentary cross section of a fuel assembly of a boiling-water reactor, in which a grid-shaped spacer 2 is disposed inside a fuel-assembly box 1 in each of various axial positions and fuel rods are guided through grid meshes or apertures of the spacer 2. The fuel rods are formed of a fuel-rod or sheathing cladding tube 3 which, if appropriate, is provided on its inside with a lining or liner 4 and which surrounds an oxidic fuel filling, such as fuel tablets or pellets 5. The lining has approximately 5–20% of the thickness of the sheathing tube and is metallurgically bound. For example, two corresponding concentric tubes can be extruded jointly and (for example by Pilgrim rolling) processed mechanically to the dimension of the sheathing tube.

Special loads on the fuel rod are to be taken into account where the inner lining 4 of the fuel-rod sheathing tubes is concerned. Thus, for example during fission, iodine and other fission products are formed in the interior of the fuel-rod and, in contrast to other corrosion processes, they do not lead to the formation of surface layers of corroded material or to the stripping off of material in a measurable quantity, but instead cause local damage in the material structure which leads to sources from which rapidly growing cracks can emanate under mechanical loads.

Furthermore, a high temperature gradient and a corresponding heat flow occur between the hot fuel filling on the inside of the sheathing tube and the coolant on the outside of the sheathing tube, and oxide layers on the sheathing tube constitute a particular heat-flow barrier. Therefore, with progressive corrosion, pronounced variations in the local heat load occur which is also subject to pronounced fluctuations in time when control elements in the reactor core are moved in and out, for example for load-alternation control. Moreover, as a result of the irradiation, the fuel filling enclosed by the sheathing tube swells increasingly during the operating time.

Therefore, intimate contacts between the cladding and the pellet, and high chemical and mechanical loads (so-called "Pellet Cladding Interaction" PCI) which can lead to local damage resulting later in small holes, often occur on the inside of the sheathing tubes. On one hand, coolant can enter the fuel rod through these holes, thereby impairing the corrosion conditions on the inside, and on the other hand fission products can escape into the coolant and lead to radioactive contamination there. Consequently, the inner lining 4 of the two-layer sheathing tube ("duplex tube") is used on one hand to provide a diffusion barrier for aggressive fission products and on the other hand to provide a ductile protective layer for the reduction of mechanical stresses on the inside of the sheathing tube.

Tables 2a and 2b mention a large number of patent applications in which the number of these PCI defects is to be sharply reduced by producing the inner lining not from zircaloy, but from pure zirconium or zirconium sponge, in which minor additives (iron, chromium and/or niobium) are often considered advantageous. However, alloying additives, which are not permitted for workpieces of the reactor core according to the current standards and/or which are present in quantities that are well outside the limits which are applicable to zircaloy, are accepted by the licensing authorities and power-station operators only after lengthy and expensive preparation times and only for specific uses, for example for the thin inner linings of duplex tubes. Scrap and waste occurring during the production of sheathing tubes consequently cannot be melted down and used as a starting material for other alloys (for example, for spacers or for the thicker outer layers of the duplex tubes) without further action. However, if all duplex tubes made of conventional zircaloy with an inner lining made of pure zirconium or zirconium sponge are used, then, although the frequency of the local PCI defects can possibly be greatly reduced, nevertheless individual sheathing tubes can burst open or exhibit cracks emanating from inside and leading to large-area damage, through which large quantities of fission products can escape.

Even a small amount of such large-area damage can lead to a considerably higher contamination of the coolant than a large number of local PCI defects. At the same time, there can be other primary causes of damage which can never be excluded with complete certainty, for example microscopic welding faults on the closing caps of the fuel rods or mechanical damage caused by fretting.

Figure 2:
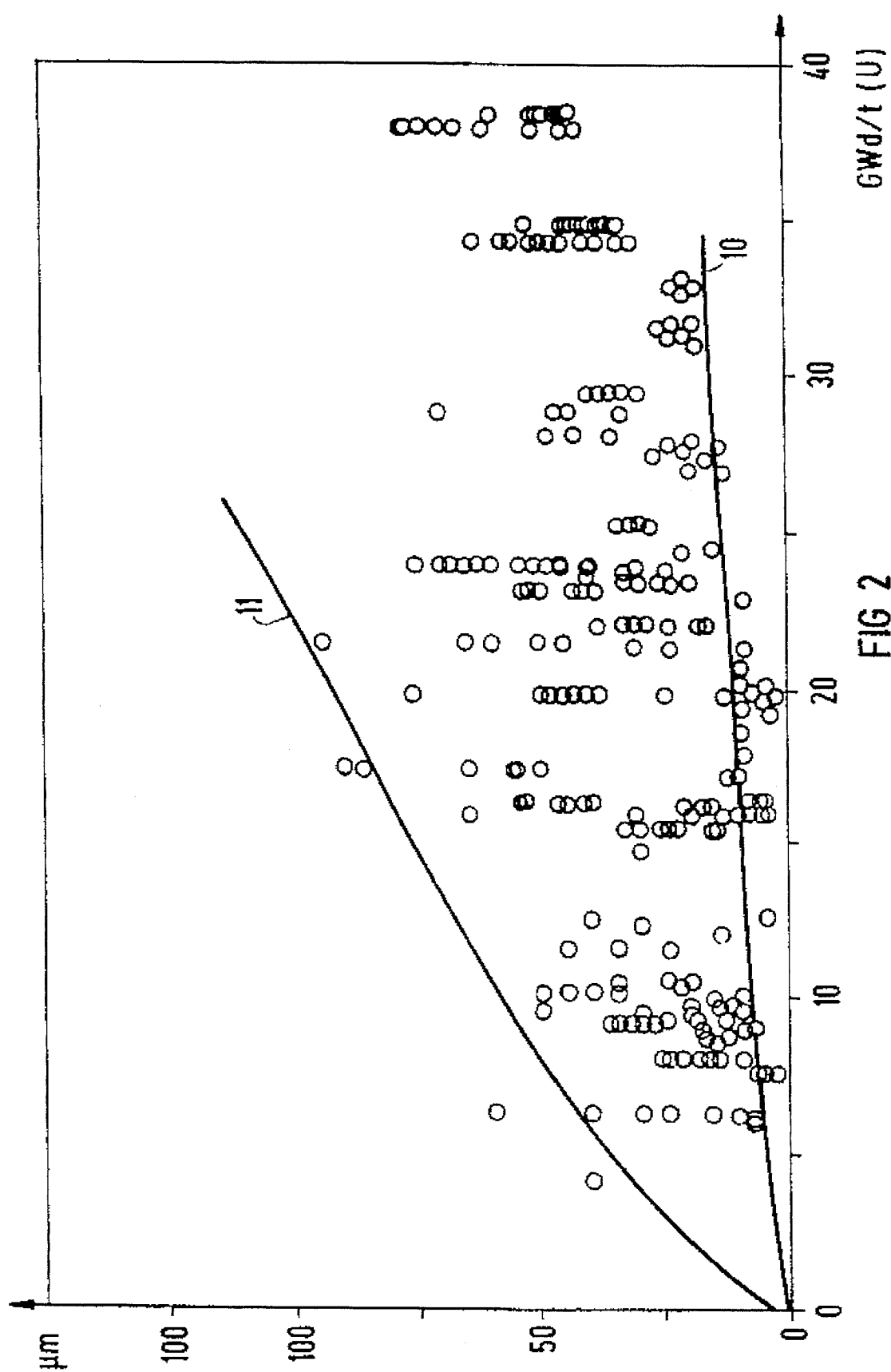
FIG. 2 is a diagram showing an oxide-layer growth in the case of zircaloy as a result of corrosion in a boiling-water reactor.
Figure 3:
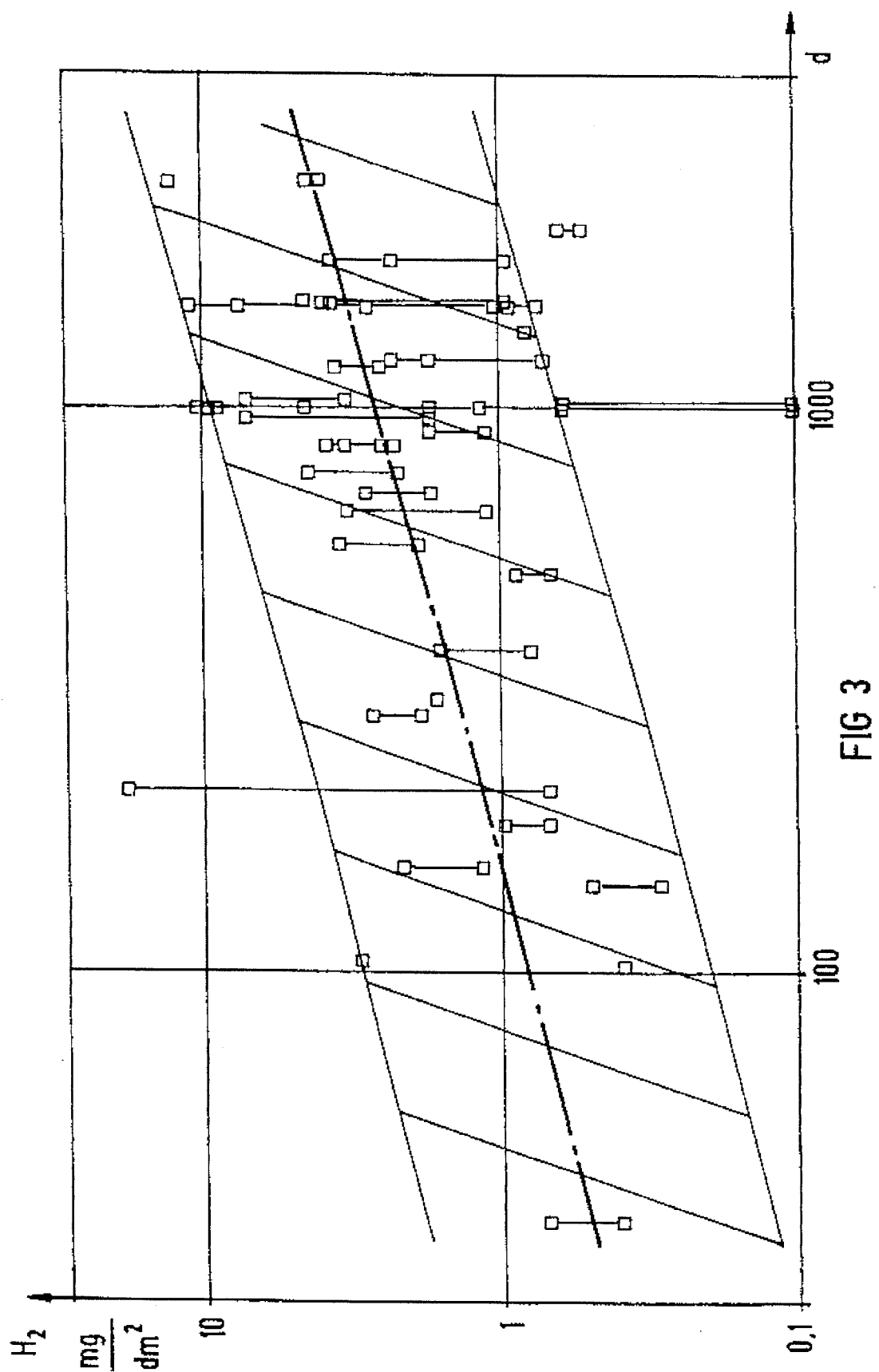
FIG. 3 is diagram showing a hydrogen absorption of zircaloy in a boiling-water reactor.

Consequently, for example, the material thicknesses of the structural parts of the boiling-water fuel assembly which are shown in FIG. 1 must be selected in such a way that, within the operating time provided for the service life of the fuel assembly, the uniform corrosion to be expected in light of the material properties, nodular corrosion and hydrogenation as well as the load-alternation resistance and the risk of damage to the sheathing tube, at least in the case of fuel rods cannot lead to a premature failure of the part. However, the material properties responsible for damage of this kind are subject to pronounced spreads. FIGS. 2 and 3 respectively show values that are observed under reactor conditions, of the oxide layer growing with an increasing burn-up (operating time) and of the characteristic weight increase and the hydrogen absorption that is critical for mechanical stability, for zircaloy materials which each conform to the ASTM standard. The construction of the structural parts is to be based on the most unfavorable case, that is to say the upper limits of these disturbing influences and the longest operating times.

FIG. 2 shows the oxide-layer thicknesses of fuel rods having sheathing tubes which are produced homogeneously and from conventional zircaloy and which have been extracted from boiling-water reactors after the respective fuel assemblies have attained different burn-ups of their nuclear fuel. A lower curve 10 indicates a mean layer-thickness growth which occurs on fuel rods having an essentially uniformly corroded surface. Many of these uniformly corroded rods were produced in a way which leads to the alloying additives being partially precipitated as particles ("secondary precipitations") of a specific particle size in the grain structure of the tube material. An upper curve 11 describes the growth of the corrosion sources ("nodules") which form in fuel rods having predominantly nodular corrosion.

The materials according to the invention exhibit only very slight nodular corrosion and lie around values in the vicinity of or below the curve 10. The spreads of the oxidation behavior which occur on conventional Zry tubes are therefore confined to an optimum range.

The hydrogen absorption (measured in mg $H_2$ per $dm^2$) has a very pronounced spread both in Zry fuel sheathing tubes and in Zry spacers, irrespective of the extent of the cold forming used for producing them. These measured values were also recorded after different dwell times of the workpieces in boiling-water reactors.

In this case as well, the spread range is to be confined to a low range by means of a controlled selection of the quantities of alloying additives to be added to the zircaloy ("Zry"), but optimization regarding corrosion is also to be achieved according to the curve 10 in FIG. 2. However, an alloying additive having a favorable effect on corrosion resistance can have an unfavorable effect on hydrogen absorption.

In order to investigate these influences, a plurality of workpieces were produced from different predetermined alloys by identical or at least comparable production methods and were exposed to the conditions of the reactor core over four operating cycles in tests involving a very high outlay. The chemical composition of some of the workpieces was analyzed in detail and is indicated in Table 5.

Figure 4:
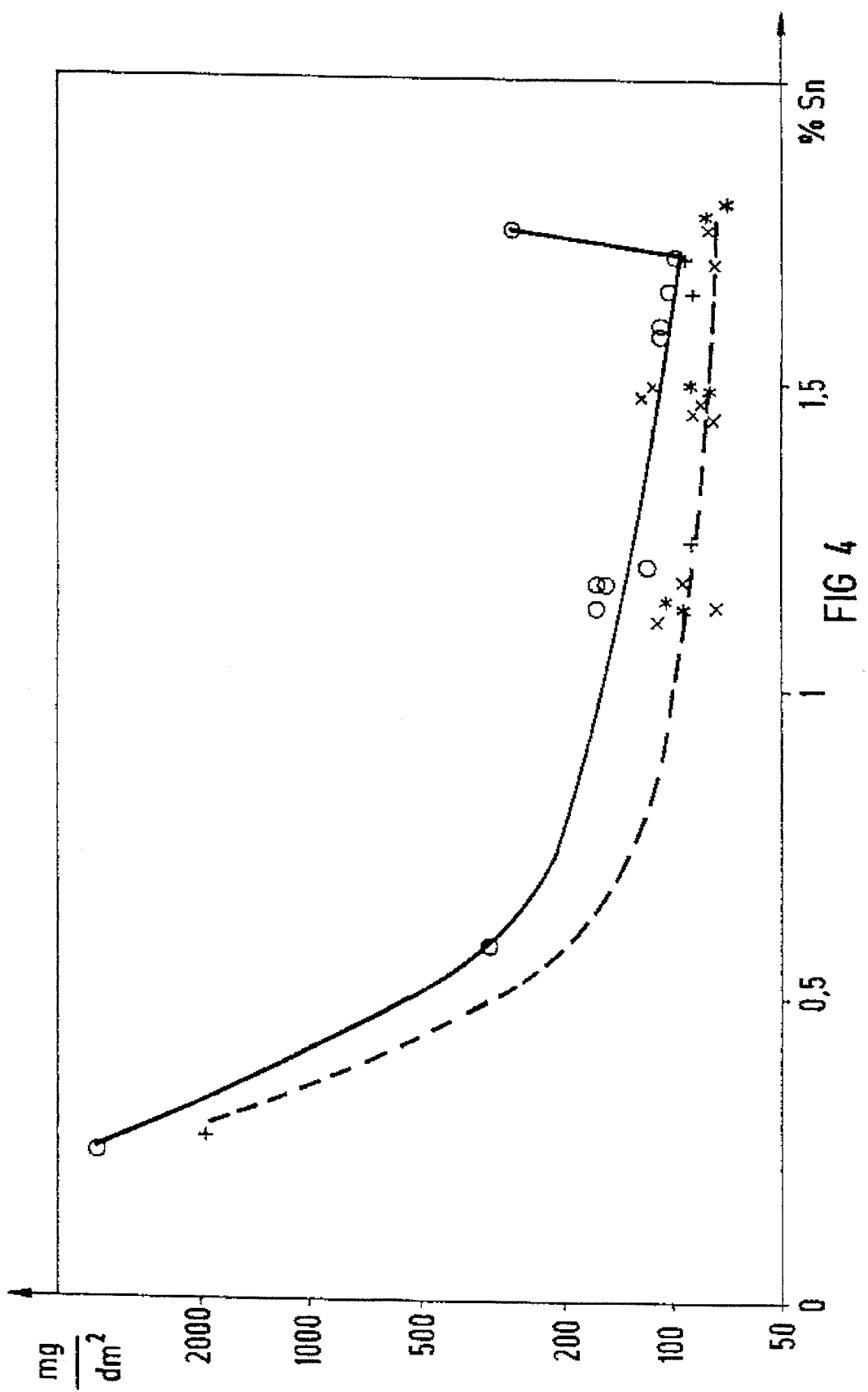
FIG. 4 is a diagram showing an influence of alloyed chromium and silicon or reduced oxygen on a corrosion of a material, with different tin contents.
Figure 5:
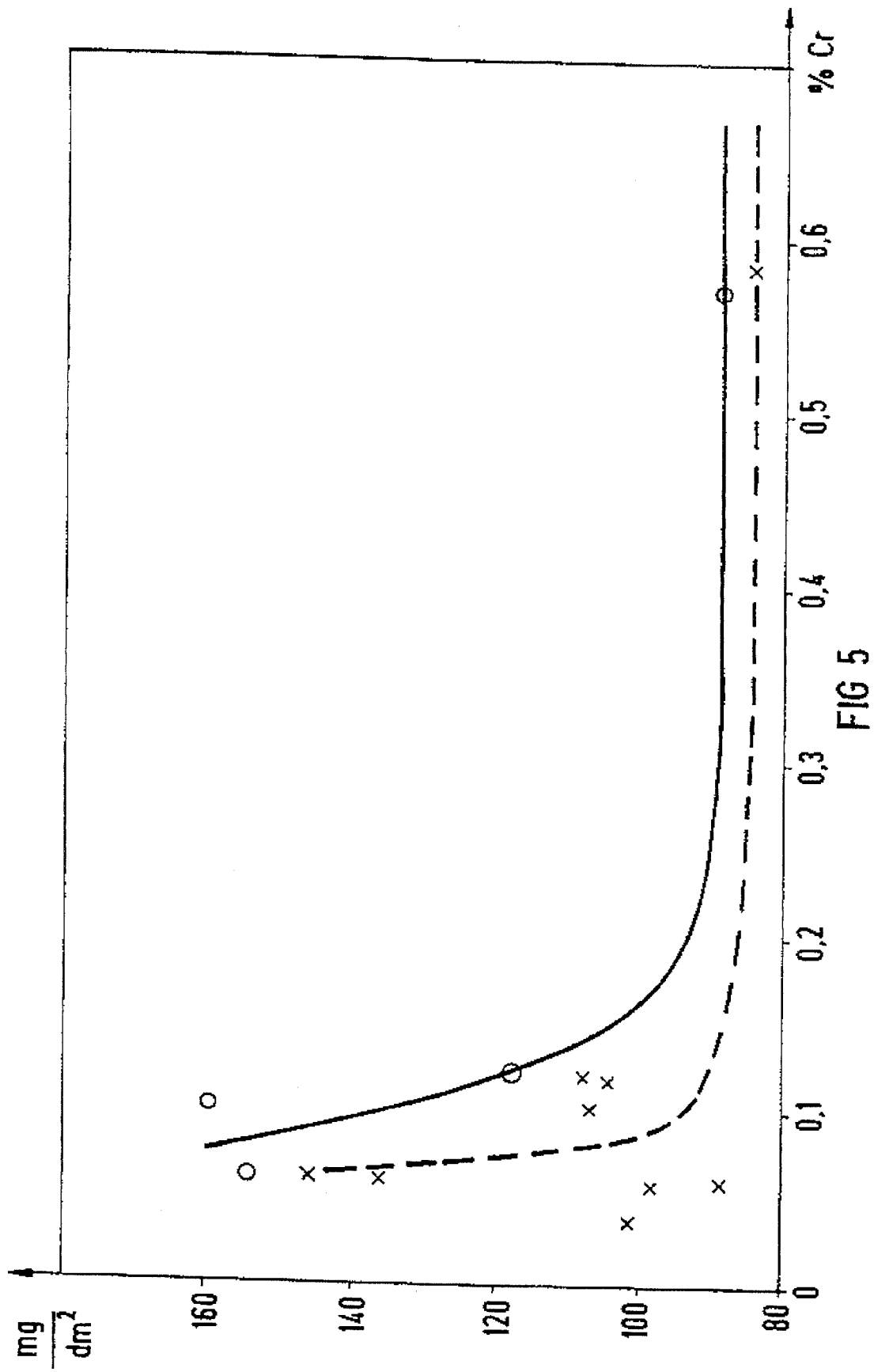
FIG. 5 is a diagram showing an influence of a different chromium content on a corrosion of materials, with two different tin contents.

At the same time, according to FIG. 4, it is seen that in comparison with normal compositions (symbol "o"), in each case an increased content of chromium (symbol "+"), a high content of silicon (symbol "x") and a reduced content of oxygen (symbol "*") is associated with a varied corrosion. In particular, a solid line in FIG. 5 shows the dependence of the weight increase of the surface (milligrams per $dm^2$) for a variable chromium content in the case of a material containing 1.2% by weight of tin (measuring points "o"), while a broken line shows this dependence in the case of a material containing 1.65% by weight of tin. At chromium contents above approximately 0.1% by weight, and preferably above 1.5% by weight, only a slight tendency toward corrosion is therefore to be expected, and this is virtually maintained even at high chromium contents.

Figure 6:
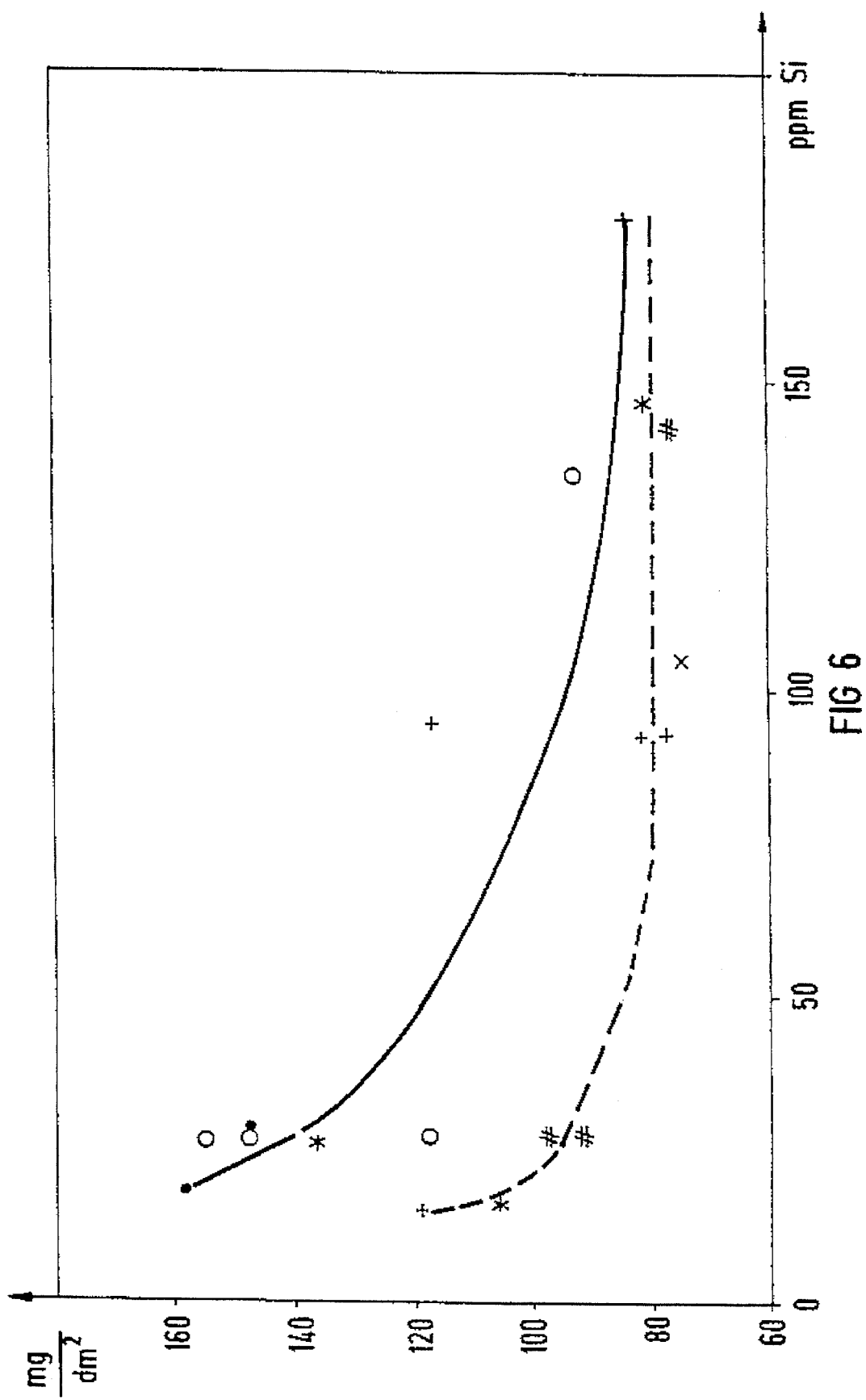
FIG. 6 is a diagram showing a corresponding influence of silicon, with a different content of Sn and C.

FIG. 6 shows corrosion-related weight increases after four fuel-assembly cycles for a material with 1.2% by weight of tin and a carbon content of less than 120 ppm (symbol "o") and of between 170 and 270 ppm (symbol "."), a silicon content of less than 40 ppm and an oxygen content of 1200 ppm. When the tin content is increased to 1.5% by weight, this results in measured values which are indicated by the symbol "+" for the material having the lower carbon content and by the symbol "x" for a material having the higher carbon content, while in the case of a tin content of 1.7% by weight, the corresponding measured values are identified by the symbols "#" and "*". Broken lines indicate a dependence of the weight increase on the silicon content which would seem to apply to an advantageous material having a tin content of more than 1.4 and preferably more than 1.45%, by weight, and a carbon content of less than 200 ppm and preferably less than 150 ppm, while the dependence represented as a solid line is to be expected for materials having a lower tin content and/or a higher carbon content.

Figure 7:
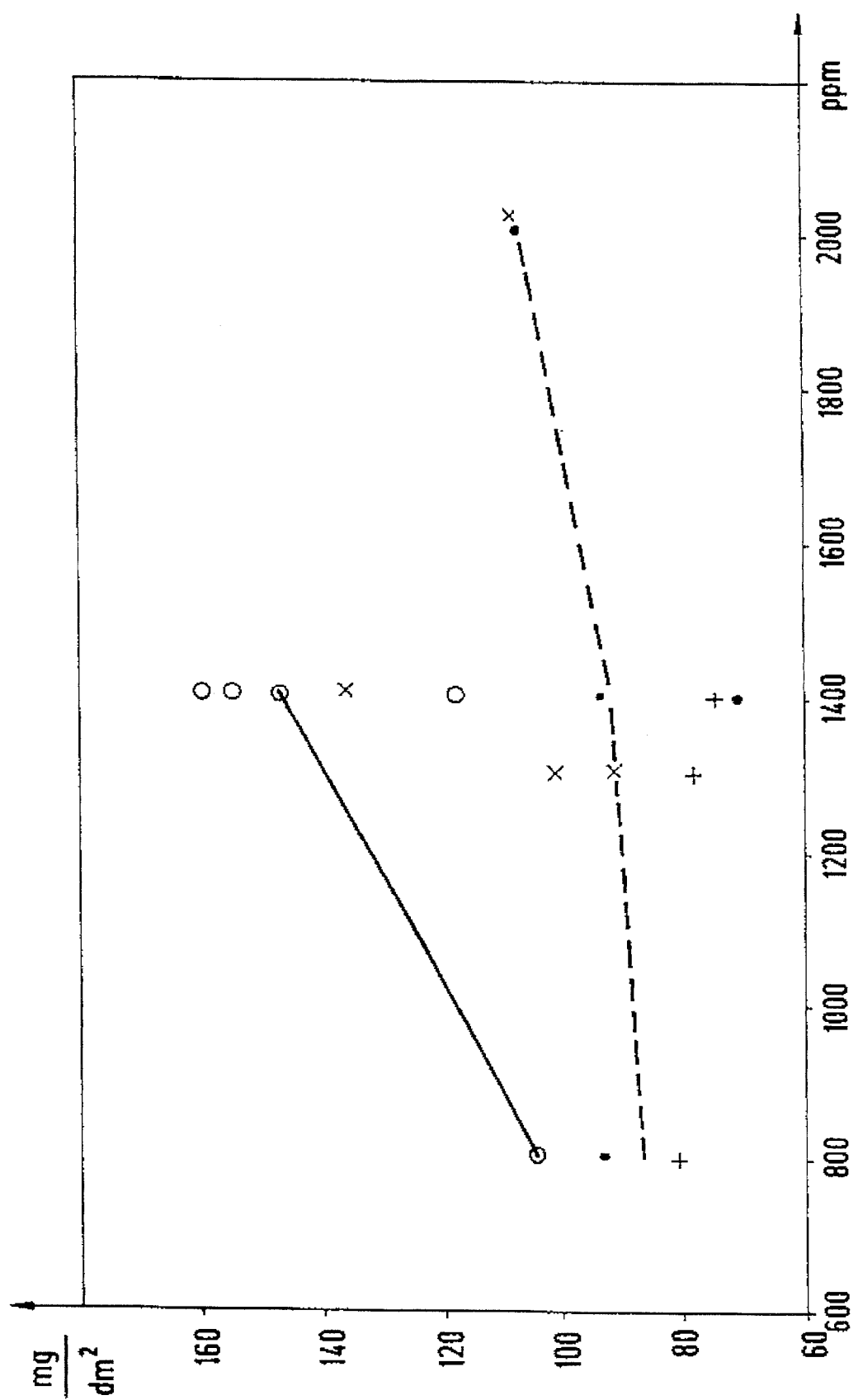
FIG. 7 is a diagram showing an influence of oxygen on corrosion in the case of materials having a different content of tin and/or silicon.

According to FIG. 7, with the material having the lower tin content (1.2%), a silicon content of less than approximately 40 ppm leads to an unfavorable dependence of the weight increase on the oxygen content, which is indicated by the symbol "o" and which is represented by a solid line. Measured values with an advantageous silicon content of between 86 and 177 ppm are identified by the symbol "." and lie approximately on the broken line which also describes measured values with a tin content of approximately 1.7% by weight and a silicon content being between 86 and 177 ppm (symbol "+"). At approximately 1.7% Sn and below 40 ppm Si, the values (symbol "x") are spread. Thus, while a silicon content of less than approximately 50 ppm leads to an unfavorable weight increase, a reduction in the susceptibility to corrosion can be expected particularly in the case of silicon contents of between 70 and 200 ppm.

It should be noted, at the same time, that the dependence of the corrosion behavior on these alloying constituents is different from, and in the case of almost all constituents is in opposition to, the dependence which is found from the already mentioned results of short-term corrosion tests at markedly higher temperatures (see the article by R. A. Draham et al in: "ASTM STP 1023" 1988 page 334) and which is used for the fuel rods of pressurized-water reactors (see the article by Weidinger and Lettau in "IAEA Int. Symp. on improvements in Water Reactor Fuel Technology for LWR Fuel", page 451, Stockholm, 1986). The corrosion behavior in the boiling-water reactor therefore differs appreciably from observations which can be found at increased temperatures and/or in the case of the water chemistry of the pressurized-water reactor.

It has already been mentioned with regard to FIG. 2 that the alloying constituents of zircaloy reduce the long-term corrosion of Zry fuel rods when the intermetallic precipitations occurring in zircaloy have a particular minimum size.

In order to set a specific diameter of the secondary precipitations, the temperature and duration of the heat treatments that are carried out after the commencement of particle precipitation must be checked. This advantageously takes place by first heating the material (for example, a tube blank obtained from the alloy) to temperatures of above 1000° C. (beta annealing or solution annealing), with the alloying constituents passing to solution. Quenching to temperatures of below 800° C. (alpha range) gives rise to finely distributed precipitations which can grow during further heat treatments that are always carried out in this alpha range.

It is found, for different annealing temperatures T and annealing durations t of this beta treatment, that identical mean particle sizes are obtained in the same alloy composition when the parameter (particle-size growth parameter, Particle Growth Parameter "PGP"):

$$PGP=10^{14} \cdot t \cdot exp\ (-Q/nRT)$$

is the same. In this case, n is a size typical of the growth process (for example, n=2 for the grain-size growth, n=0.57 for the secondary precipitation considered in this case) and Q/R is an activation temperature (in this case: 18240 K) dependent on the alloying elements.

Figure 8:
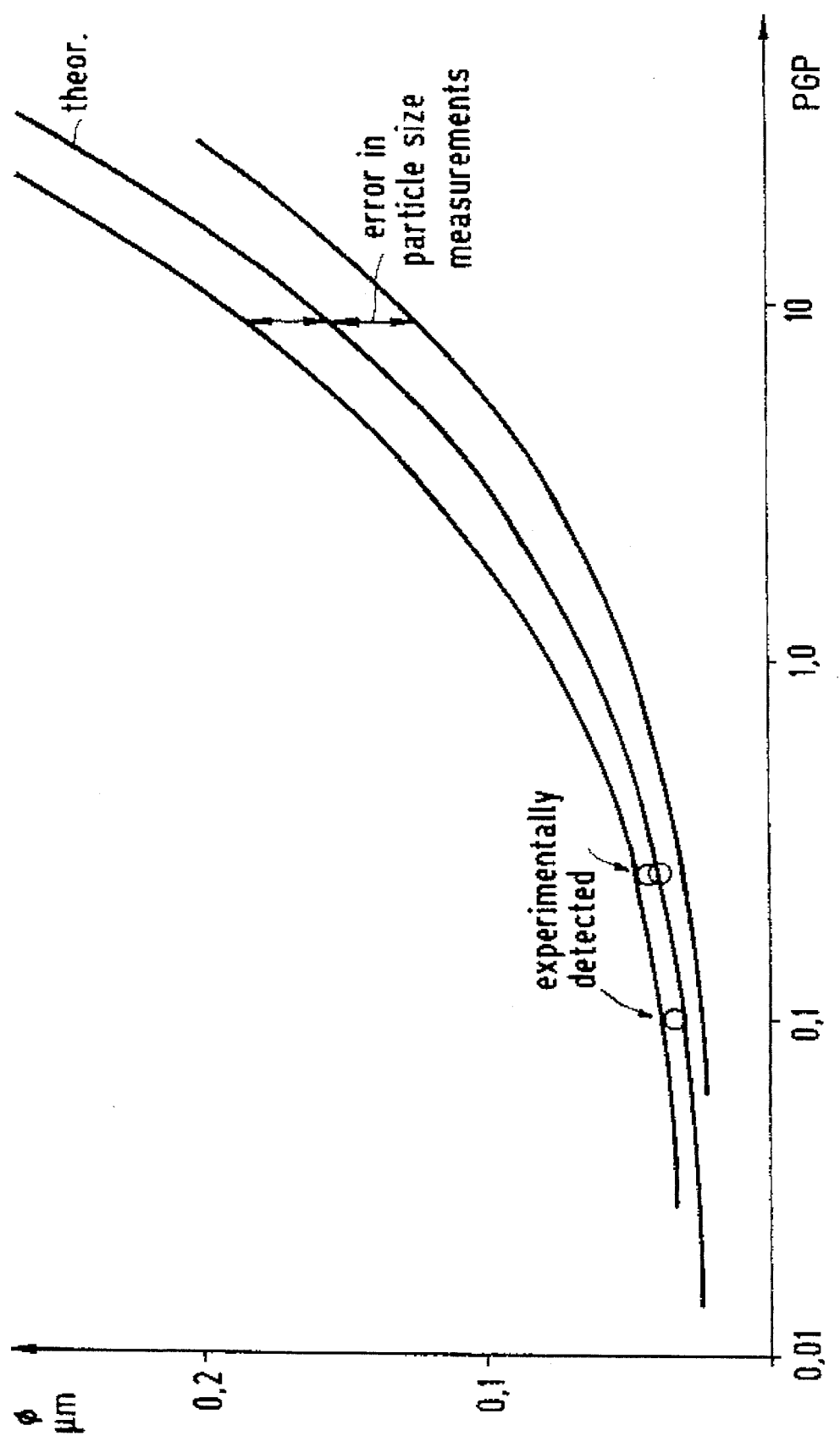
FIG. 8 is a diagram showing a ratio of a particle-growth parameter to an amount of secondary precipitations.

This PGP value makes it possible to assign the particle diameter that is obtained to different annealing durations and annealing temperatures. FIG. 8 shows the relation between PGP and particle diameter.

The production of two-layer sheathing tubes therefore advantageously proceeds from a two-layer tube blank that is obtained by the extrusion of two concentric tubes and which is quenched after solution annealing. The final dimensions are obtained in subsequent mechanical processing operations (for example, in a Pilgrim rolling machine), in such a way that between each processing step, intermediate annealing is carried out at specific temperatures and respective annealing durations, and in such a way that in total, the desired PGP is obtained. This can be followed, where appropriate, by a concluding annealing at a temperature at which particle growth virtually no longer takes place.

Rolled metal sheets and workpieces of homogeneous composition can also be produced in a similar way.

The materials according to the invention have a PGP of between 0.06 and 1.0 and advantageously between 0.1 and 0.6. This corresponds approximately to advantageous particle sizes of the secondary precipitations of between 0.3 and 0.7 μ.

Figure 9:
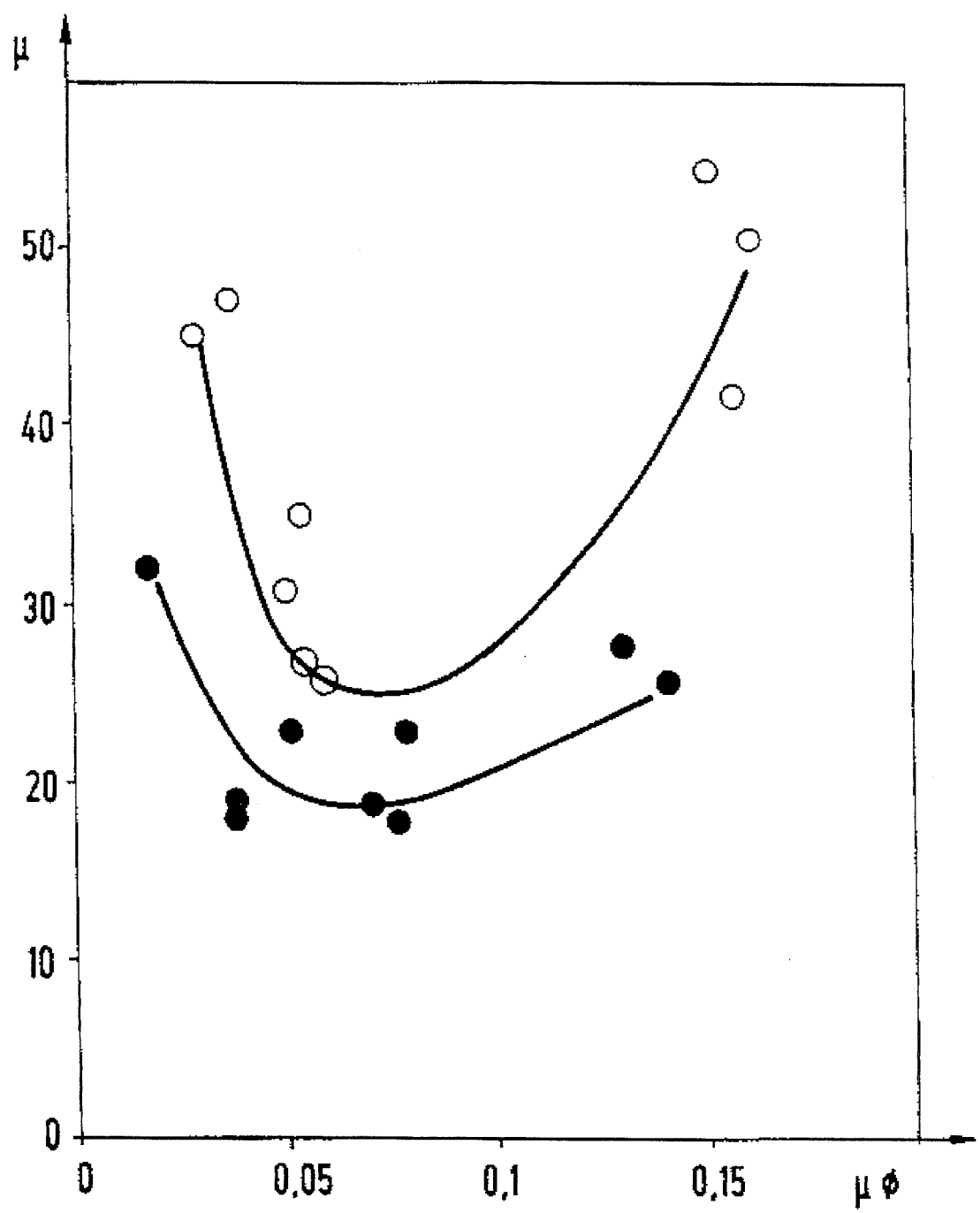
FIG. 9 is a diagram showing an influence of a mean diameter of secondary precipitations on corrosion sensitivity.

FIG. 9 shows the thickness of the oxide layers which is found after 4 operating cycles for two different reactors (symbol "o" and symbol "."), as a function of the mean diameter of the intermetallic precipitations (secondary precipitation) formed in the zircaloy.

Figure 10:
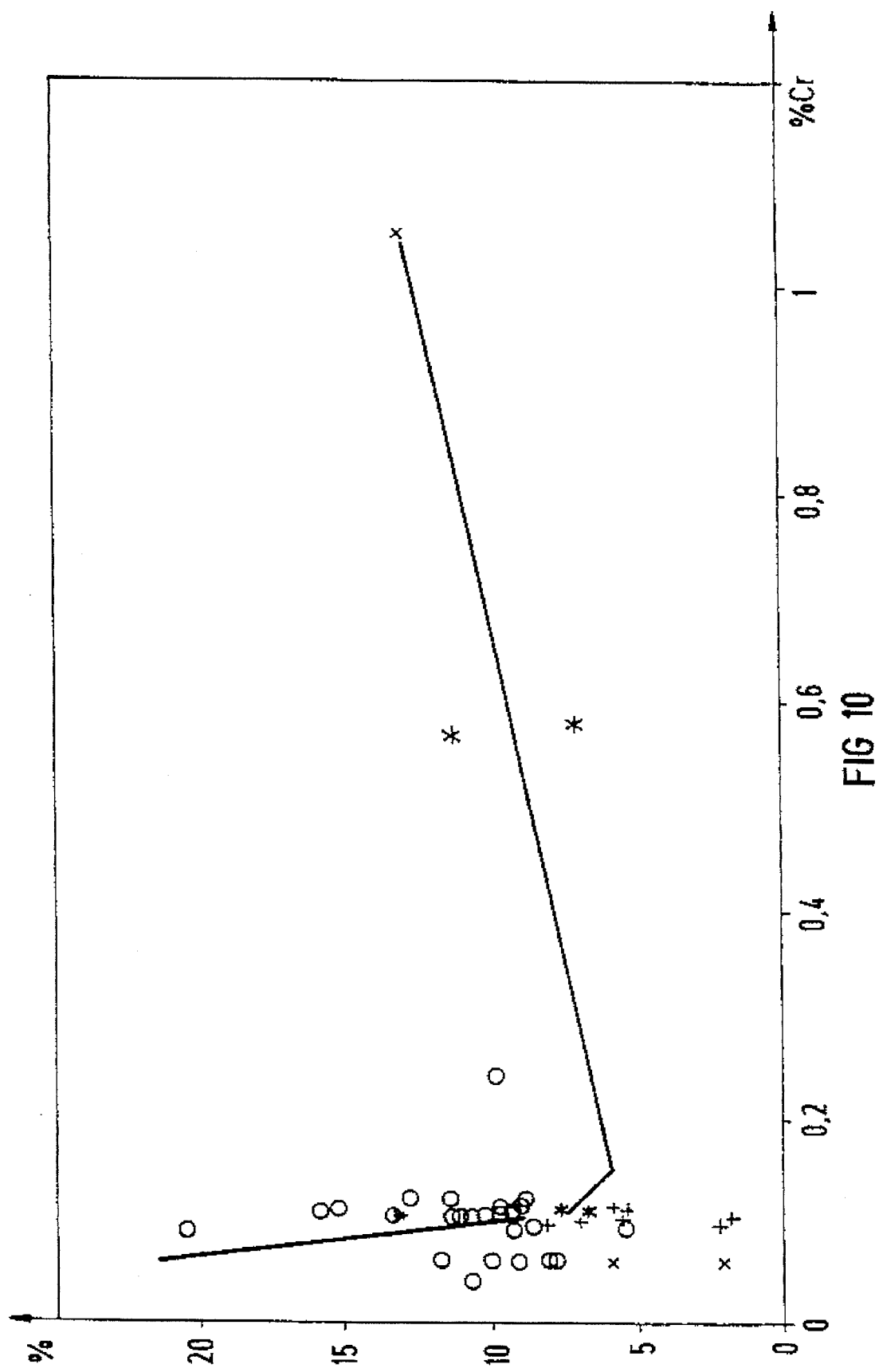
FIG. 10 is a diagram showing a relative hydrogen absorption of a material as a function of a chromium content.

In the case of material samples taken from the boiling-water reactor after two charging cycles, FIG. 10 shows that, at least in the case of a chromium content of between approximately 0.05 and 0.4% by weight, the relative hydrogen absorption (that is to say, the absorbed hydrogen as a percentage of the hydrogen being theoretically released during oxidation) is virtually independent of the oxidation itself:

Relative hydrogen absorptions of below approximately 7.5% can be observed in the case of a low weight increase of the material (below 65 mg/dm² symbol "+") a high weight increase (above 200 mg/dm², symbol "x") and values located between them (between 65 and 90 mg/dm², symbol "," and between 91 and 200 mg/dm², symbol "o"). It is shown, however, that the hydrogen absorption from the coolant is influenced by the chromium content of the material. Advantageously, the chromium content is maintained above 0.1 (preferably above 0.12%) by weight and below approximately 0.3 (preferably approximately 0.25%) by weight.

As already mentioned, zircaloy has clearly higher corrosion stability in relation to water vapor than pure zirconium and, as thermodynamic considerations and experimental tests show, the oxidic surface layer forming during the corrosion of zircaloy constitutes a considerable barrier to hydrogen which diffuses in.

Where microscopic damage occurs to the sheathing tube, coolant can penetrate into the interior of the fuel rods. Such water vapor in the inner volume leads to an oxide layer on the inner surface of the sheathing tube, but above all also to a further oxidation of the fuel and therefore to the formation of a particular hydrogen partial pressure and additional hydrogenation. These processes emanating from the interior of the fuel rod are counteracted by an oxide layer which forms on the inner surface made of zircaloy.

However, since the swelling fuel comes into mechanical contact with the sheathing tube, particularly in load alternations and associated thermal variations in the cross section of the sheathing tube, individual local damage to the protective oxide layer can occur, for example as a result of aggressive fission products, such as iodine or cesium. At such locations of damage, hydrogen can then penetrate unimpeded into the material according to its partial pressure, and lead to secondary hydrogenation there. Such "sunburst" hydrogenations can be perceived first as dents on the inner surface of the sheathing tubes and subsequently lead to small holes. Inner linings made of pure zirconium or alloys based on it are intended, on one hand, to reduce the mechanical stresses quickly as a result of their ductility and, on the other hand, to oppose an additional barrier to the aggressive fission products, so as to thereby produce a sheathing tube which is largely insensitive to load alternations and which shows a reduced frequency of PCI defects.

On the other hand, however, a liner of this type, with its high purity in comparison with zircaloy, is at a greater risk of corrosion: if water enters through a microscopic primary defect, a thicker oxide layer with a higher hydrogen partial pressure forms, and at the same time the better barrier effect of an oxide layer forming on zircaloy is no longer afforded. Thus, as soon as the presence of water vapor and hydrogen in the inner volume of the fuel rod is not prevented completely, there is the fear that the tendency to rare but large-area hydrogenations will increase, in the case of load alternations and an already clearly lower defect frequency, despite a reduced PCI sensitivity.

However, pronounced hydrogenations increase the brittleness of the material, so that the risk of large-area cracks as a result of individual defects grows as a consequence of a liner of this type. Experience seems to confirm this.

Furthermore, since the thicker oxide layers forming on liners of pure zirconium have poor thermal conductivity, local heating and thermal changes in volume of the fuel lead to mechanical stresses which further intensify the changes in volume caused by the oxidation. Thus, although the liner should per se compensate for the susceptibility to defects of the sheathing tube under load changes, in such cases intensified mechanical stresses, and finally a bursting open or tearing open of the sheathing tube, occur. Larger quantities of fuel can then escape into the coolant through these cracks, so that even only a few relatively large cracks of this kind cause a higher contamination of the coolant and therefore more serious operating damage than a multiplicity of local PCI defects.

The advantages of the zircaloy modified according to the invention are combined with the construction of a liner by producing an inner lining from pure zirconium or zirconium sponge, in which case a constituent which increases corrosion resistance to water vapor and which does not influence the strength is alloyed to it.

Although European Patent No. 121 204 discloses a liner made of zirconium sponge with a tin alloy of between 0.1 and 1% by weight, nevertheless, in the first place, an addition of that type reduces only the sensitivity to nitrogen-containing impurities of the material and can, at most, serve for approximating the corrosion of zirconium sponge, which, due to its impurities, corrodes more easily than high-purity zirconium, to the corrosion resistance of high-purity zirconium. Sufficient corrosion resistance could be achieved, at most, by means of further additional alloying constituents.

In contrast thereto, the invention proceeds from the fact that an addition of iron is advantageous in many respects.

Figure 11:
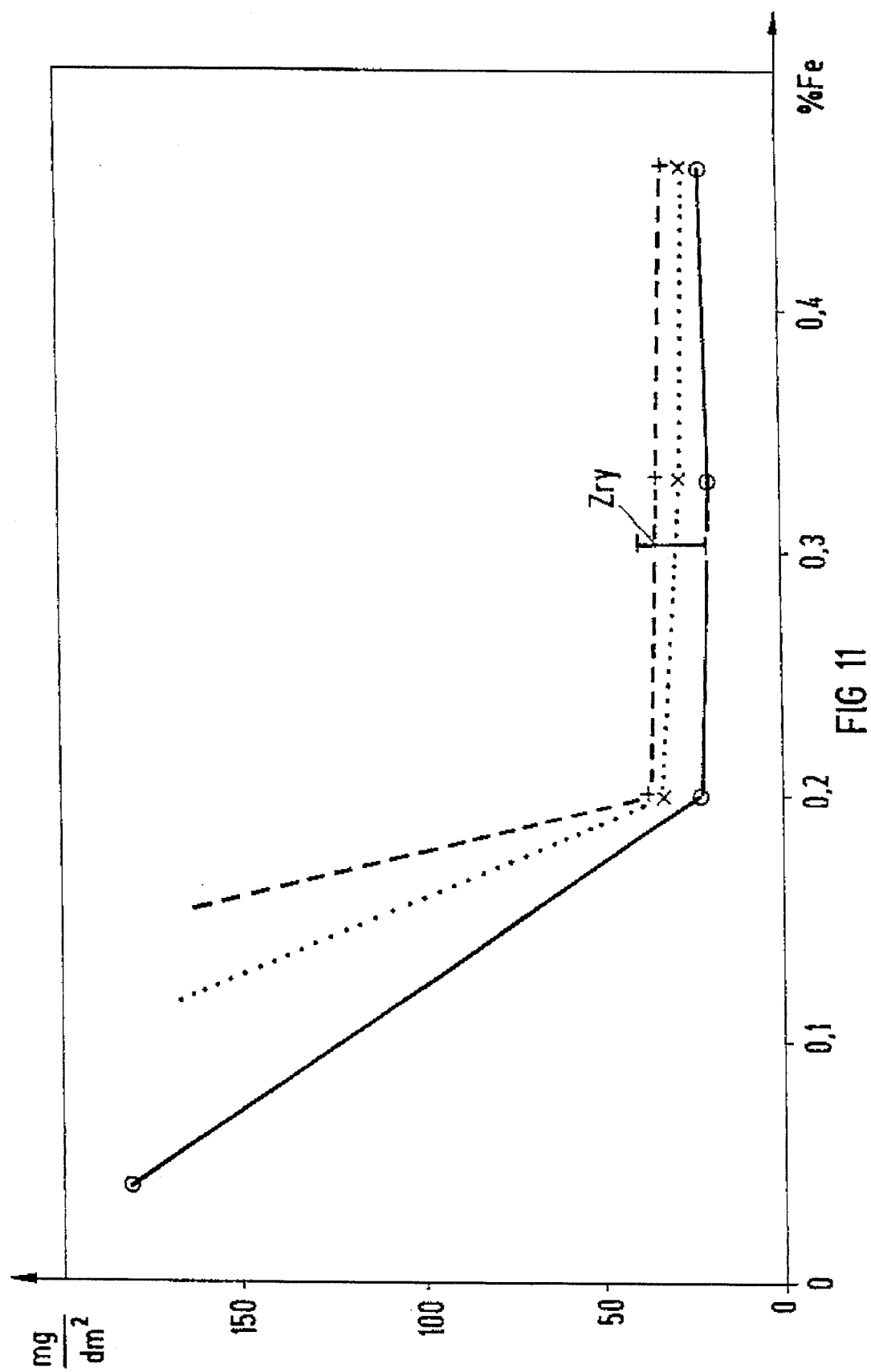
FIG. 11 is a diagram showing an influence of iron on a corrosion behavior of a zirconium liner at 350° C.

FIG. 11 shows the corrosion-related weight increase of a zirconium/iron alloy after 30 days (symbol "o"), after 60 days (symbol "x") and after 100 days (symbol "+"), with a respective iron content of approximately 0.2 and 0.33 and approximately 0° 46% by weight. The values obtained thereby for a liner material with 0.2% Fe or more are virtually in the same range which is also found with zircaloy.

Figure 12:
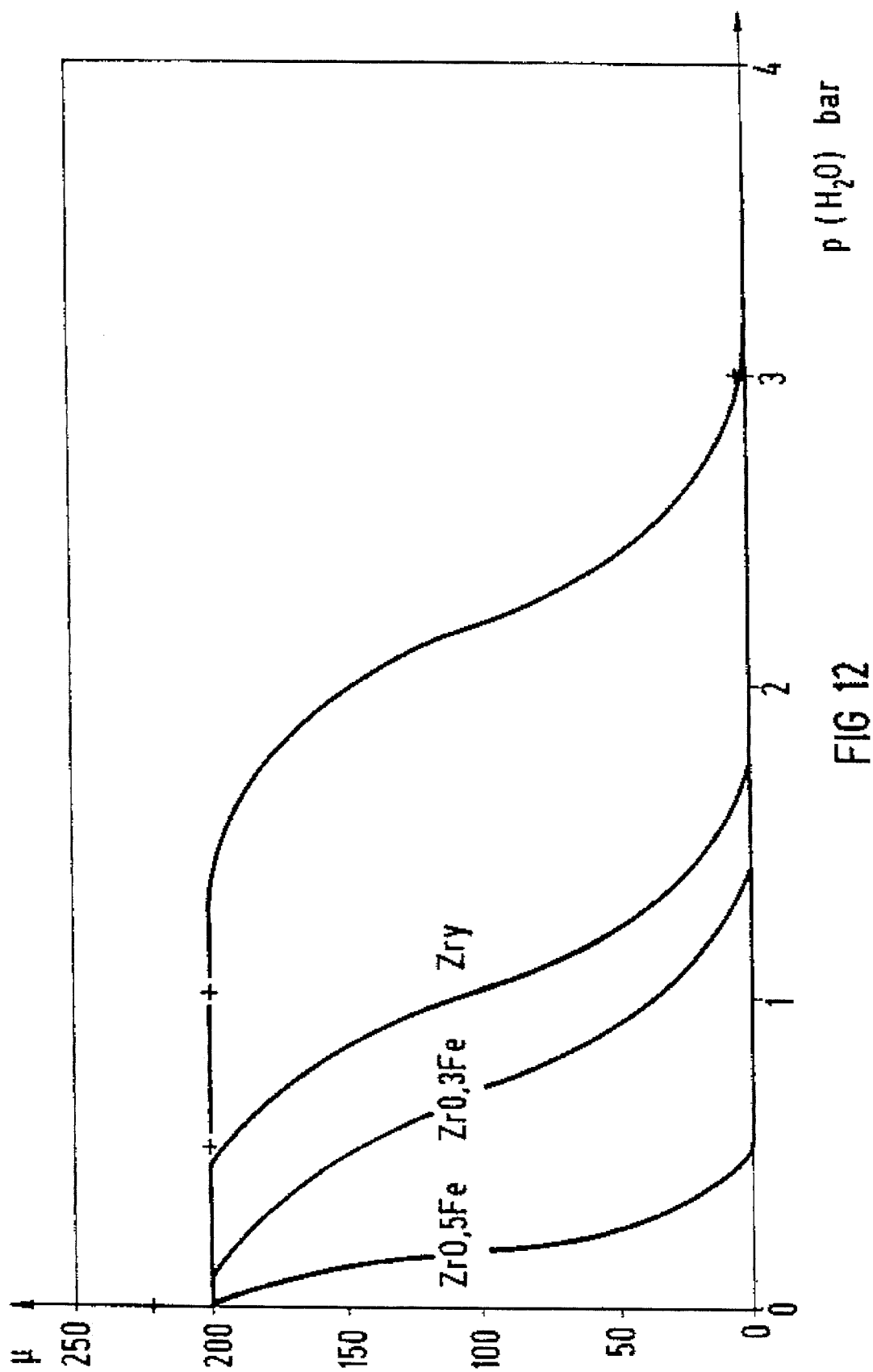
FIG. 12 is a diagram showing a thickness of a hydride border as a function of an $H_2O$ partial pressure in the case of variously doped zirconium/iron liners.

FIG. 12 shows the thickness of a hydride border occurring on a zirconium-sponge liner (symbol "+") which was exposed for three days to a hydrogen atmosphere of 100 bar at 350° C., with the partial pressure $p(H_2O)$ of water vapor in the hydrogen atmosphere being varied.

At a high vapor-pressure ratio $p(H_2)/p(H_2O)$, that is to say when a large part of the water which has penetrated into the sheathing tube is converted into $H_2$ by oxidation of the fuel, a relatively thick hydride layer forms on the material surface. In the other case, in which, for example, there is only little hydrogen, virtually no hydrogenation takes place. The aim is therefore to shift the critical value at which hydrogenation decreases as a function of the vapor pressure as far as possible towards low ratios $p(H_2O)/p(H_2)$.

The curve in FIG. 12 which is designated by "Zry" shows that even with zircaloy, better ratios are obtained, that is to say a zirconium liner is unfavorable not only with respect to uniform corrosion, but also with respect to hydrogenation (and therefore secondary damage). However, a liner material made of zirconium with an iron content of above 0.3% shows a marked improvement.

Figure 13:
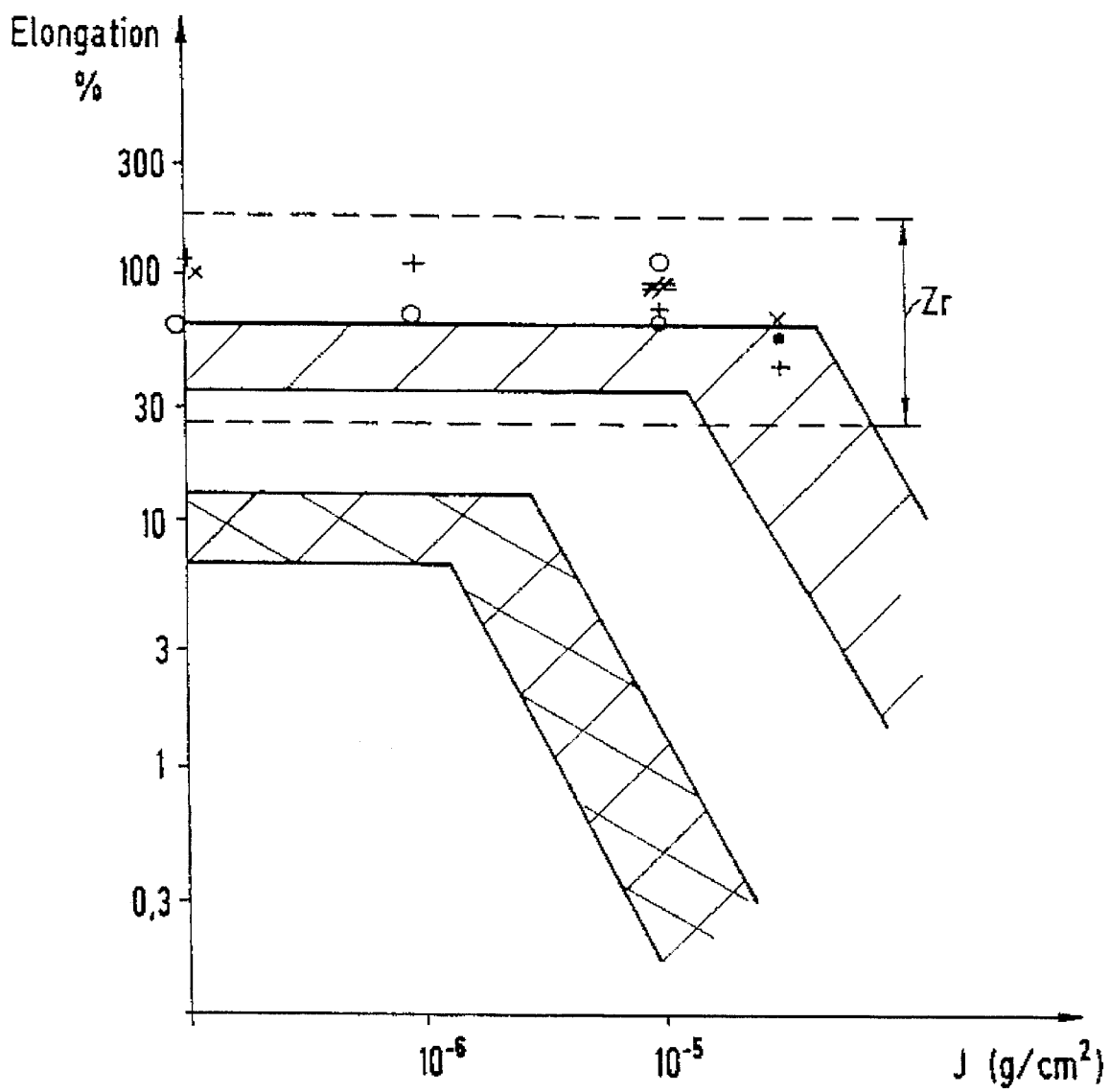
FIG. 13 is a diagram showing a comparison of elongations at the breaking of sheathing tubes occurring in the case of different iodine concentrations.

In regard to ductility which, particularly in the case of power changes, is considered necessary for reducing the PCI effects, iron is particularly suitable, since it virtually does not dissolve in pure zirconium, but collects in a few, relatively large precipitations from intermetallic phases. The favorable ductility of zirconium is therefore impaired neither by a foreign solution constituent nor by a multiplicity of foreign precipitations. Furthermore, FIG. 13 shows that a sheathing tube with a liner doped with different iron contents (0.2% by weight, symbol "+" or 0.33% by weight, symbol "x" or 0.46% by weight, symbol "o"), even when its surface is exposed to different iodine quantities, breaks only under very high elongations which are approximately in the range of an elongation at break that is designated in the figure by Zr and found for Zry sheathing tubes with a liner made of unalloyed zirconium. Heretofore conventional Zry sheathing tubes without a liner break even under elongations which come within a lower range represented in the figure by double hatching, and the values of the liner according to the invention are scarcely achieved even when a fine grain structure of the zircaloy is ensured by special production measures (hatched region of FIG. 13).

The invention thus provides a material which, in terms of its alloying constituents, does not differ fundamentally from permitted zirconium alloys, but, in regard to chemical and mechanical stability, has reproducible and reliable material properties which, in the case of conventional zirconium alloys, are obtained by chance only in an unreproducible way. The dimensioning of corresponding sheathing tubes of a boiling-water fuel assembly can therefore proceed from these reproducible values, without spreads having more unfavorable values needing to be taken into account. The sheathing tube produced from the material according to the invention is provided with an iron-containing inner lining which largely protects the sheathing tube against damage on the inside.

TABLE 1

| Element | Sponge Grade R60001 | Zry 2 Grades R60802 R60812 | Zry 4 Grades R60804 R60814 | Zr/Nb Grade R60901 |
|---|---|---|---|---|
| | Composition, Weight % | | | |
| Tin | ... | 1.20–1.70 | 1.20–1.70 | ... |
| Iron | ... | 0.07–0.20 | 0.18–0.24 | ... |
| Chromium | ... | 0.05–0.15 | 9.07–0.13 | ... |
| Nickel | ... | 0.03–0.08 | ... | ... |
| Niobium | ... | ... | ... | 2.40–2.80 |
| Oxygen | 1) | 1) | 1) | 0.09–0.13 |
| Iron + Chromium + Nickel | ... | 0.18–0.38 | ... | ... |
| Iron + Chromium | ... | ... | 0.28–0.37 | ... |
| | Maximum Impurities, Weight % | | | |
| Aluminum | 0.0075 | 0.0075 | 0.0075 | 0.0075 |
| Boron | 0.00005 | 0.00005 | 0.00005 | 0.00005 |
| Cadmium | 0.00005 | 0.00005 | 0.00005 | 0.00005 |
| Carbon | 0.027 | 0.027 | 0.027 | 0.027 |
| Chromium | 0.020 | ... | ... | 0.020 |
| Cobalt | 0.0020 | 0.0020 | 0 0020 | 0.0020 |
| Copper | 0.0050 | 0.0050 | 0.0050 | 0.0050 |
| Hafnium | 0.010 | 0.010 | 0.010 | 0.010 |
| Hydrogen | 0.0025 | 0.0025 | 0.0025 | 0.0025 |
| Iron | 0.150 | ... | ... | 0.150 |
| Magnesium | 0.0020 | 0.0020 | 0 0020 | 0.0020 |
| Manganese | 0.0050 | 0.0050 | 0.0050 | 0.0050 |
| Molybdenum | 0.0050 | 0.0050 | 0.0050 | 0.0050 |
| Nickel | 0.0070 | ... | 0.0070 | 0.0070 |
| Nitrogen | 0.0080 | 0.0080 | 0.0080 | 0.0080 |
| Silicon | 0.0120 | 0.0120 | 0.0120 | 0.0120 |
| Tin | 0.0050 | ... | ... | 0.0050 |
| Tungsten | 0.010 | 0.010 | 0 010 | 0.010 |
| Uranium (total) | 0.00035 | 0.00035 | 0.00035 | 0.00035 |

1) When so specified in the purchase order, oxygen shall be determined and reported: Maximum or minimum permissible values, or both, shall be as specified in the purchase order.

TABLE 2a

| No. | Sn min | Sn max | Fe min | Fe max | Cr min | Cr max | Nb min | Nb max | Ni min | Ni max | Ox min | Ox max | Fe + Cr + Ni |
|---|---|---|---|---|---|---|---|---|---|---|---|---|---|
| DE 3226403 | | | | | | | | | | | | | |
| DE 3038366 | | | | | | | | | | | | | ZrO2 + Cu |
| DE 3442209 | | | | | | | | | | | | | 0.4 ... 1.5 |

TABLE 2a-continued

| | Sn | | Fe | | Cr | | Nb | | Ni | | Ox | | |
|---|---|---|---|---|---|---|---|---|---|---|---|---|---|
| No. | min | max | min | max | min | max | min | max | min | max | min | max | Fe + Cr + Ni |
| DE 3248235 | | | | | | | | | | | | | Cu 0.02 . . . 0.2 |
| EP 0192405 | | | | | | | | | | | | | |
| J 62047582 | | | | | | | | | | | | | V: 0.05–0.5 |
| DE 3248235 | | | | | 0.05 | 0.3 | | | | | | | |
| DE 3248235 | | | | | | | | | | | | | Fe + Cr 0.2–0.25 |
| EP 0195154 | | | | | | | | | | | | | |
| DE 3248235 | | | | | 0.15 | 0.25 | | | | | | | |
| J 62047582 | | | | | | | | | | | | | V: 0.2.8b: 0.05–0 |
| US 4894203 | | | | | | | | | | | | | |
| DE 3248235 | | | | | | | | | | | | | |
| EP 0192405 | | | | | | | | | | | | | |
| DE 3248235 | | | | | | | | | | | | | Cu: 0.05 . . . 0.15 |
| DE 3124935 | | | | | | | | | | | | | |
| DE 3003610 | | | | | | | | | | | | | |
| EP 0155603 | | | | | | | | | | | | | |
| 83-795434 | | | | | | | | | | | | | |
| J 62047582 | | | 0.05 | 0.2 | | | | | | | | | V: 0.05–0.5 |
| DE 3248235 | | | 0.2 | 0.25 | | | | | | | | | |
| DE 3248235 | | | 0.02 | 0.3 | | | | | | | | | |
| J 62047582 | | | 0.05 | 0.2 | | | | | | | | | |
| US 4894203 | | | | | | | | | | | | | |
| US 4894203 | | | 0.2 | 0.3 | 0.05 | 0.3 | 0.01 | 0.6 | | | 0.15 | 0.3 | Cu 0.02 . . . 0.2 |

TABLE 2b

| | Sn | | Fe | | Cr | | Nb | | Ni | | Ox | | |
|---|---|---|---|---|---|---|---|---|---|---|---|---|---|
| No. | min | max | min | max | min | max | min | max | min | max | min | max | Fe + Cr + Ni |
| DE 3310054 | | | | | | | 0.2 | 0.4 | | | | | |
| DE 3310054 | | | | | | | 0.1 | 0.5 | | | | | |
| DE 3310054 | | | | | | | 0.1 | 0.5 | | | | | |
| US 4894203 | | | 0.2 | 0.3 | 0.05 | 0.3 | 0.01 | 0.6 | | | 0.15 | 0.3 | Cu: 0.02 . . . 0.2 |
| EP 0326898 | | | 0.02 | 0.2 | 0.05 | 0.3 | 0.01 | 0.6 | | | 0.02 | 0.2 | Cu: 0.02 . . . 0.2 |
| US 7152507 | | | 0.2 | 0.3 | 0.05 | 0.3 | 0.01 | 0.6 | | | 0.15 | 0.3 | Cu: 0.02 . . . 0.2 |
| EP 0161539 | | | | | | | | | | 100 | | | |
| EP 0155168 | 0.5 | | 0.05 | | | | | | 300 | | | | |
| EP 0155168 | 0.5 | | 0.08 | | | | | | 70 | | | | |
| EP 0155168 | 0.5 | | 0.04 | | | | | | 70 | | | | |
| SE 8406646 | 0.18 | 0.22 | 0.09 | 0.11 | | | 0.08 | 0.11 | 0.09 | 0.11 | | | |
| SE 8406646 | 0.22 | 0.28 | 0.22 | 0.28 | | | | | | | | | |
| EP 0195155 | 0.1 | 0.3 | 0.05 | 0.2 | 0.03 | 0.1 | 0.05 | 0.4 | 0.03 | 0.1 | 300 | 1200 | <0.25 |
| EP 0195154 | 0.19 | 0.3 | 0.19 | 0.3 | | | | | | | | | |
| EP 0194797 | .4 | 0.5 | 0.5 | 1.4 | | | | | | | | | |
| SE 8406646 | 0.45 | 0.55 | 0.18 | 0.22 | | | | | 0.18 | 0.22 | | | |
| SE 8406646 | 0.45 | 0.55 | 0.35 | 0.45 | | | | | | | | | |
| EP 0155167 | 0.1 | 0.6 | 0.07 | 0.24 | 0.05 | 0.5 | 0.15 | | | 0.05 | | 350 | |
| 85-231841 | 0.2 | 0.6 | 0.03 | 0.11 | | | | | | | | 350 | |
| EP 0155168 | 0.2 | 0.6 | 0.03 | 0.06 | | | | | | | | | |
| EP 0195154 | 0.4 | 0.6 | 0.1 | 0.3 | | | | | 0.1 | 0.3 | | | |
| EP 0194797 | 0.4 | 0.6 | 0.5 | 1.4 | | | | | | | 100 | 700 | |
| EP 0195154 | 0.4 | 0.6 | 0.3 | 0.5 | | | | | 0.1 | 0.3 | 100 | 700 | |
| EP 0195154 | 0.4 | 0.6 | 0.3 | 0.5 | | | | | | | | | |
| EP 0195154 | 0.4 | 0.6 | 0.1 | 0.3 | | | | | | | | | |
| 85-231840 | 0.1 | 0.6 | 0.07 | 0.24 | 0.05 | 0.15 | | | | 0.05 | | 350 | |
| EP 0195154 | 0.19 | 0.6 | 0.19 | 0.5 | | | | | | | | | |
| EP 0155168 | 0.4 | 0.6 | 0.03 | 0.11 | | | | | | | | 350 | |
| EP 0195154 | 0.19 | 0.6 | 0.19 | 0.5 | | | | | | | | | |
| EP 0155168 | 0.2 | 0.6 | 0.03 | 0.11 | | | | | | | | 350 | |
| EP 0194797 | 0.4 | 0.6 | 0.5 | 1 | | | | | | | | | |
| EP 0121204 | 0.1 | 1 | | | | | | | | | | | |

TABLE 3

|  | Min. % by weight | Max. % by weight |  |  |
|---|---|---|---|---|
| Sn | 1.45 | 1.7 | Zry: | 1.2 ... 1.70 |
| Fe | 0.15 | 0.4 (0.3/0.24) | Zry 2: | 0.07 ... 0.20 |
|  |  |  | Zry 4: | 0.18 ... 0.24 |
| Cr | 0.1 (0.12) | 0.3 (0.25) | Zry 2: | 0.05 ... 0.15 |
|  |  |  | Zry 4: | 0.07 ... 0.13 |
| Ni |  | 0.08 (0.05) | Zry 2: | 0.03 ... 0.08 |
|  |  |  | Zry 4: | 0 ... 0.007 |
| Fe & Cr & Ni |  |  | Zry 2: | 0.18 ... 0.38 |
| Fe & Cr |  |  | Zry 4: | 0.28 ... 0.37 |
| Si | 0.005 (0.007) | 0.012 | Zry: | <0.012 |
| O | 0.04 (0.07) | 0.12 (0.11) |  |  |
| C |  | 0.02 (0.015) | Zry: | <0.027 |

TABLE 4

|  |  | Zry 2 | | Zry 4 | | Zry-Cr |
|---|---|---|---|---|---|---|
|  |  | min | max | min | max |  |
| Tin | % | 1.45 | 1.70 | 1.45 | 1.70 |  |
| Iron | % | 0.15 | 0.20 | 0.20 | 0.24 |  |
| Chromium | % | 0.12 | 0.15 | 0.10 | 0.13 | 0.25 |
| Nickel | % | 0.03 | 0.05 | — | — |  |
| Fe + Cr + Ni | % |  | 0.38 |  | 0.37 | 0.40 |
| Silicon | ppm | 70 | 120 | 70 | 120 |  |
| Oxygen | ppm | 700 | 1100 | 700 | 1100 |  |
| Carbon | ppm |  | 150 |  | 150 |  |

TABLE 5

| Sn (%) | Fe (%) | Cr (%) | Ni (%) | O (%) | C (ppm) | Si (ppm) |
|---|---|---|---|---|---|---|
| 1.17 | 0.17 | 0.06 |  | 0.14 | 120 | 26 |
| 1.71 | 0.17 | 0.06 |  | 0.13 | 90 | 27 |
| 1.20 | 0.24 | 0.12 |  | 0.14 | 93 | 27 |
| 1.15 | 0.16 | 0.06 |  | 0.14 | 283 | 28 |
| 1.18 | 0.17 | 0.06 |  | 0.14 | 90 | 135 |
| 1.17 | 0.17 | .06 |  | 0.14 | 77 | 30 |
| 1.75 | 0.24 | 0.12 |  | 0.13 | 60 | 26 |
| 1.72 | 0.15 | 0.06 |  | 0.14 | 270 | 26 |
| 1.69 | 0.17 | 0.06 |  | 0.14 | 73 | 141 |
| 1.70 | 0.17 | 0.06 |  | 0.13 | 67 | 27 |
| 1.14 | 0.21 | 0.10 |  | 0.08 | 40 | 20 |
| 1.49 | 0.21 | 0.10 |  | 0.08 | 50 | 93 |
| 1.79 | 0.21 | 0.10 |  | 0.08 | 60 | 170 |
| 1.13 | 0.18 | 0.09 |  | 0.14 | 60 | 177 |
| 1.47 | 0.21 | 0.10 |  | 0.13 | 40 | 177 |
| 1.14 | 0.21 | 0.10 |  | 0.20 | 40 | 126 |
| 1.48 | 0.18 | 0.10 |  | 0.19 | 40 | 14 |
| 1.13 | 0.22 | 0.10 |  | 0.08 | 200 | 151 |
| 1.50 | 0.21 | 0.10 |  | 0.08 | 190 | 15 |
| 1.75 | 0.21 | 0.11 |  | .08 | 180 | 86 |
| 1.45 | 0.21 | 0.10 |  | 0.14 | 160 | 103 |
| 1.75 | .21 | 0.10 |  | 0.13 | 170 | 147 |
| 1.13 | 0.21 | 0.10 |  | 0.14 | 170 | 17 |
| 1.12 | 0.20 | 0.10 |  | 0.20 | 190 | 97 |
| 1.49 | 0.20 | 0.10 |  | 0.19 | 180 | 158 |
| 1.75 | 0.20 | 0.10 |  | 0.20 | 170 | 15 |
| 1.60 | 0.23 | 0.12 |  | 0.18 | 230 | 25 |
| 1.45 | 0.21 | 0.10 |  | 0.09 | 41 | 35 |
| 1.48 | 0.22 | 0.10 |  | 0.10 | 93 | 93 |
| 1.58 | 0.21 | 0.12 |  | 0.12 | 70 |  |
| 1.62 | 0.21 | 0.11 | 0.05 | 0.12 | 70 |  |
| 1.58 | 0.42 | 0.24 |  | 0.12 | 70 |  |
| 1.52 | 0.10 | 0.04 |  | 0.12 | 70 |  |
| 1.64 | 0.12 | 0.58 |  | 0.12 | 70 |  |
| 1.22 | 0.34 | 0.57 |  | 0.12 | 70 |  |
| 0.58 | 0.05 | 0.05 |  | 0.12 | 70 |  |
| 0.24 | 0.53 | 0.05 |  | 0.12 | 70 |  |
| 0.28 | 0.05 | 1.05 |  | 0.12 | 70 |  |

We claim:

1. A sheathing tube of a fuel rod for a boiling-water nuclear reactor, comprising:

a zirconium alloy having a given wall thickness and containing:

Sn: 1.45 to 1.7% by weight,

Fe: 0.15 to 0.4% by weight,

Cr: 0.1 to 0.3% by weight,

Ni: up to 0.08% by weight, and a remainder technically pure zirconium; and an inner lining made from an inner layer having a thickness being 5 to 20% of the given wall thickness and being formed of a zirconium alloy essentially consisting of technically pure zirconium and an alloying additive of 0.2 to 0.8% by weight Fe.

2. The sheathing tube according to claim 1, wherein said zirconium alloy has a silicon content of between 0.005 and 0.012% by weight, an oxygen content of between 0.05 and 0.12% by weight, and a carbon content of below 0.02% by weight, and said inner layer has an iron content of at least 0.3% by weight.

3. The sheathing tube according to claim 1, wherein said zirconium alloy has a silicon content of between 0.005 and 0.012% by weight, an oxygen content of between 0.05 and 0.12% by weight, and a carbon content below 0.02% by weight, and said inner layer has an iron content of at most 0.6% by weight.

4. The sheathing tube according to claim 3, wherein said inner layer has an iron content of approximately 0.5% by weight.

5. The sheathing tube according to claim 1, wherein said zirconium alloy has the following composition:

Sn: 1.45 to 1.7% by weight,

Fe: 0.15 to 0.2% by weight,

Cr: 0.12 to 0.25% by weight,

Ni: 0.03 to 0.05% by weight,

Si: 0.007 to 0.012% by weight,

O: 0.05 to 0.11% by weight,

C: below 0.015% by weight, and a remainder of technically pure zirconium; and said inner lining has the following composition:

Fe: 0.3 to 0.6% by weight, and a remainder of technically pure zirconium.

6. The sheathing tube according to claim 5, wherein said inner lining has approximately 0.5% by weight of Fe.

7. The sheathing tube according to claim 5, wherein alloying additives precipitated in said zirconium alloy have a mean particle size of between 0.03 and 0.1 μ.

8. The sheathing tube according to claim 7, wherein said alloying additives precipitated in said zirconium alloy have a mean particle size below 0.07 μ.

9. A fuel rod for a boiling-water nuclear reactor, comprising:

a sheathing tube of a zirconium alloy having a given wall thickness and containing:

Sn: 1.45 to 1.7% by weight,

Fe: 0.15 to 0.4% by weight,

Cr: 0.1 to 0.3% by weight,

Ni: up to 0.08% by weight, and a remainder technically pure zirconium; and an inner lining made from an inner layer having a thickness being 5 to 20% of said given wall thickness and being formed of a zirconium alloy essentially consisting of technically pure zirconium and an alloying additive of 0.2 to 0.8% by weight Fe.

10. The fuel rod according to claim 9, wherein said zirconium alloy has a silicon content of between 0.005 and 0.012% by weight, an oxygen content of between 0.05 and 0.12% by weight, and a carbon content of below 0.02% by weight, and said inner layer has an iron content of at least 0.3% by weight.

11. The fuel rod according to claim 9, wherein said zirconium alloy has a silicon content of between 0.005 and 0.012% by weight, an oxygen content of between 0.05 and 0.12% by weight, and a carbon content below 0.02% by weight, and said inner layer has an iron content of at most 0.6% by weight.

12. The fuel rod according to claim 11, wherein said inner layer has an iron content of approximately 0.5% by weight.

13. The fuel rod according to claim 9, wherein said zirconium alloy has the following composition:

Sn: 1.45 to 1.7% by weight,
Fe: 0.15 to 0.2% by weight,
Cr: 0.12 to 0.25% by weight,
Ni: 0.03 to 0.05% by weight,
Si: 0.007 to 0.012% by weight,
O: 0.05 to 0.11% by weight,
C: below 0,015% by weight, and a remainder of technically pure zirconium; and said inner lining has the following composition:

Fe: 0.3 to 0.6% by weight, and a remainder if technically pure zirconium.

14. The fuel rod according to claim 13, wherein said inner lining has approximately 0.5% by weight of Fe.

15. The fuel rod according to claim 13, wherein alloying additives precipitated in said zirconium alloy have a mean particle size of between 0.03 and 0.1 μ.

16. The fuel rod according to claim 15, wherein said alloying additives precipitated in said zirconium alloy have a mean particle size below 0.07 μ.

* * * * *

UNITED STATES PATENT AND TRADEMARK OFFICE
CERTIFICATE OF CORRECTION

PATENT NO : 5,539,791
DATED    : July 23, 1996
INVENTOR(S): Friedrich Garzarolli et al.

It is certified that error appears in the above-identified patent and that said Letters Patent is hereby corrected as shown below:

On the title page,
Item [30] should read as follows:

May 4, 1992   [DE]   Germany ..... 92 06 038.2
Feb. 28, 1992   International ..... PCT/DE92/00166

Item [63] should read as follows:

Continuation of PCT/DE93/00149, Feb. 22, 1993.

Signed and Sealed this

Twenty-third Day of December, 1997

*Attest:*

BRUCE LEHMAN

*Attesting Officer*    *Commissioner of Patents and Trademarks*